United States Patent
McAllister

[11] 3,834,134
[45] Sept. 10, 1974

[54] FLUID TIGHT SEAL FOR FLUID TREATING FILTER

[75] Inventor: Robert L. McAllister, Louisville, Ky.

[73] Assignee: America Air Filter Company, Inc., Jefferson County, Ky.

[22] Filed: Nov. 15, 1972

[21] Appl. No.: 306,930

[52] U.S. Cl............ 55/378, 55/341, 55/484, 55/502, 55/511, 55/DIG. 12
[51] Int. Cl............................................ B01d 39/00
[58] Field of Search ...... 55/DIG. 12, 341, 502, 514, 55/484, 511, 378, 379, 507

[56] References Cited
UNITED STATES PATENTS

| | | | |
|---|---|---|---|
| 2,853,154 | 9/1958 | Rivers | 55/378 X |
| 2,965,197 | 12/1960 | Dow et al. | 55/514 X |
| 3,124,440 | 3/1964 | Hogg | 55/484 |
| 3,401,867 | 9/1968 | Long et al. | 55/378 UX |
| 3,422,602 | 1/1969 | Janson | 55/DIG. 12 |
| 3,553,942 | 1/1971 | Harrington et al. | 55/511 X |
| 3,616,625 | 11/1971 | Cotabish et al. | 55/514 X |

Primary Examiner—Frank W. Lutter
Assistant Examiner—Kathleen J. Prunner

[57] ABSTRACT

A fluid treating filter of the extended surface area type including a frame having at least one flow-through aperture therein and a filter bag of the extended surface area type having a mouth therein for receiving fluid to be filtered therethrough, the mouth having a strip of heat shrinkable material disposed along and coextensive with its perimeter and attached thereto, the strip of heat shrinkable material being adapted for mating with the flow-through aperture frame upon subjecting the shrinkable material to heat treating conditions sufficient to shrink the material to form a fluid tight seal with the frame.

4 Claims, 4 Drawing Figures

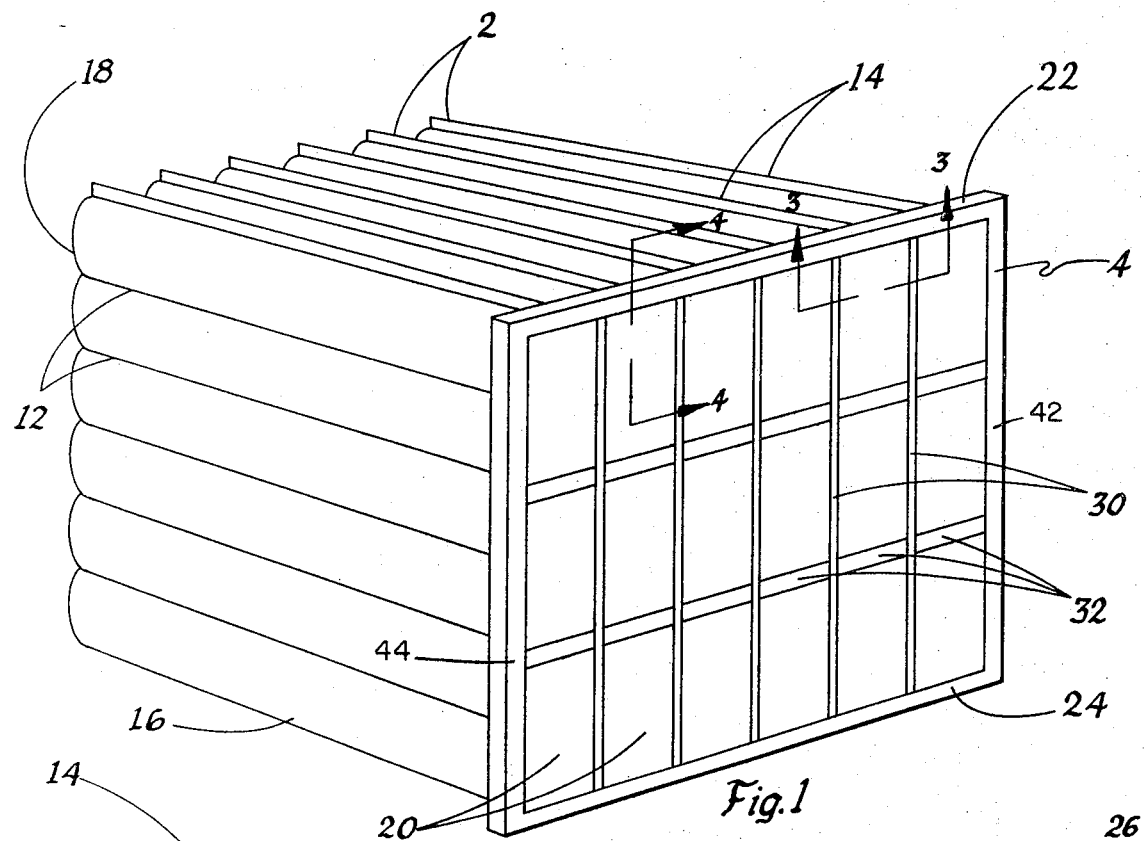
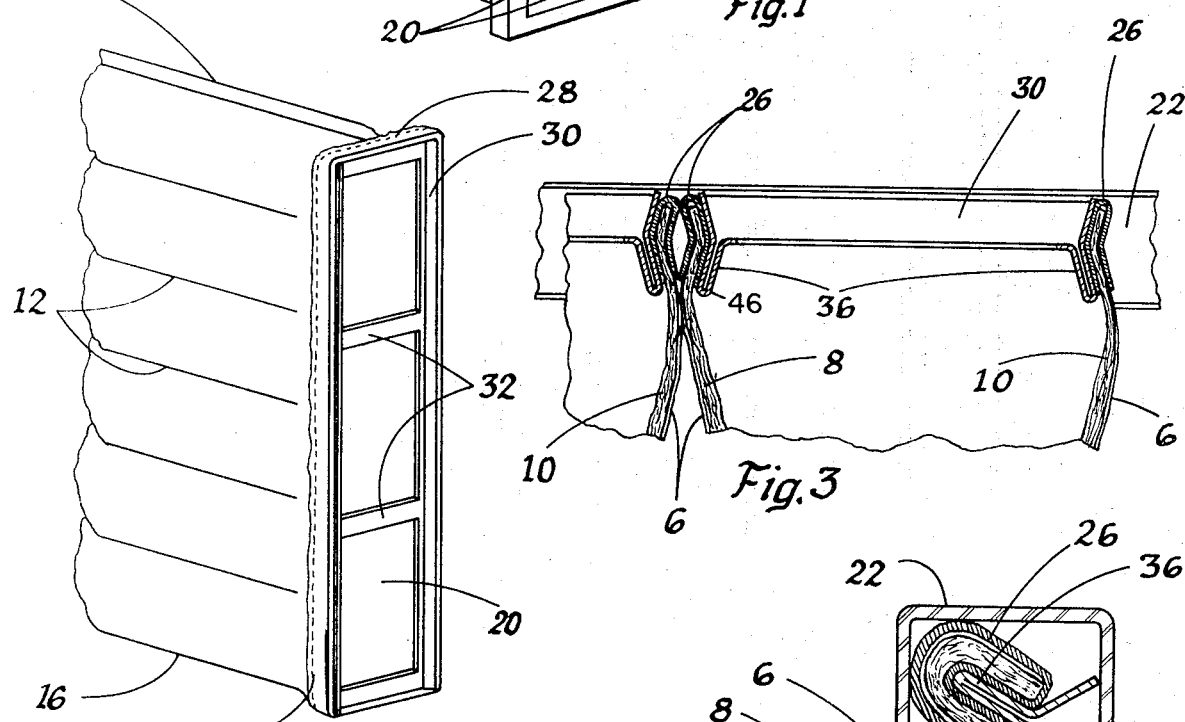
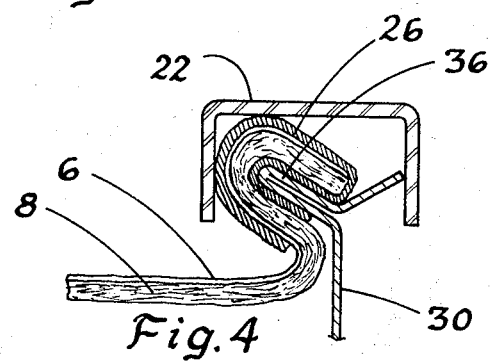

FLUID TIGHT SEAL FOR FLUID TREATING FILTER

BACKGROUND OF THE INVENTION

The invention relates to a fluid treating filter. In one aspect, it relates to a fluid treating filter of the extended surface area type. In another aspect, the invention relates to a means for attaching a filter bag of the extended surface area type to a frame utilizing heat shrinkable materials.

The fluid treating filter of the present invention is of the extended surface area type which is inflated and held in position by the fluid flow of a fluid therethrough or alternatively is supported by a header frame. Heretofore, filter bags of the extended surface area type were attached to apertured panel frames by clamps, fasteners, adhesives, and the like. Means of fastening these filter bags to frames has caused a considerable number of problems in that the frame structures were sometimes complex, the labor involved in assembly was expensive, and leakage resulted between the frame and filter bag.

SUMMARY OF THE INVENTION

In the present invention, it is recognized that it is desirable to provide a fluid treating filter of the extended surface area type wherein the filter bag is attached to an apertured frame with a fluid tight seal between the frame and the filter bag. Furthermore, it is recognized that it is desirable to provide a fluid treating filter which is easily constructed and the means for mounting the filter bag to the filter frame is relatively inexpensive.

The present invention advantageously provides a straightforward, economical arrangement for mounting a filter bag to a filter frame. The present invention further provides a fluid treating filter utilizing heat shrinkable materials for attaching a filter bag to a filter frame.

Various other features of the present invention will become obvious to those skilled in the art upon reading the disclosure set forth hereinafter.

More particularly, the present invention provides a fluid treating filter of the extended surface area type comprising a frame having an upstream and downstream side and at least one flow-through aperture therein, the aperture being defined by a flange on the downstream side of said frame; a filter bag of the extended surface area type having an open upstream end forming a mouth for receiving the fluid to be filtered, the filter bag being mounted at its upstream end, the mouth being adapted to outer fit the flange; and, a strip of shrinkable material disposed along the mouth of the filter bag, the strip of the shrinkable material being adaptable for mating with the flange in fluid tight relation.

It is to be understood that the description of the examples of the present invention given hereinafter are not by way of limitation and various modifications within the scope of the present invention will occur to those skilled in the art upon reading the disclosure set forth hereinafter.

Referring to the drawing:

FIG. 1 is a perspective view of a filter assembly of one advantageous embodiment of the present invention including an apertured frame member arranged to support a plurality of filters of the extended surface area type;

FIG. 2 is an enlarged perspective view, in cutaway, of a portion of one extended surface area type filter unit attached to a frame member of the frame assembly of FIG. 1;

FIG. 3 is an enlarged cross-sectional plan view taken in a plane passing through line 3—3 of FIG. 1; and, FIG. 4 is an enlarged cross-sectional end view taken in a plane passing through 4—4 of FIG. 1.

Referring to FIG. 1 of the drawing, a plurality of spaced extended surface area type filters 2 are disclosed as connected to and supported by apertured frame 4. The extended surface area type filters can be similar to the extended surface area type filters such as those disclosed in the U.S. letters patent to Rivers U.S. Pat. No. 2,853,154 and Hogg U.S. Pat. No. 3,124,440 and as such, can be made from any number of suitable gas filtering materials which are relatively nonstretchable and porous. Advantageously, a woven fabric or a fibrous glass type material having fibers of substantially one micron in size can be used. To provide a tensile strength to filters 2 and to insure that the filters 2 are properly supported in position when the fluid stream is to be filtered, each filter 2 can be faced with a scrim-type material 6 (FIG. 3), this material being stronger in nature than the fibrous glass type filtering material and of greater porosity. In a preferred filter 2 that may be used in the instant invention, the filter 2 may be, for example, formed from two relatively long rectangular sheets of filter media 8 and 10 (FIG. 3), respectively, the sheets of filter media 8 and 10 being attached by a plurality of filamentary stays 12. The side edges of the filter media 8 and 10 including the scrim material 6 are stitched together or otherwise secured along the top and bottom edges as at 14 and 16. Downstream edges are also stitched together or otherwise secured along the edges as at 18.

The width of the filter media employed to form the filter 2 will be such that the perimeter of the open end, when given an elongated rectangular shape, will extend from the upper portion of the frame at upper frame member 22 to the lower portion of the frame at lower frame member 24, and be of a width such that a selected number of pockets or elongated tubular compartments will fill the space between the portions 22 and 24.

As shown in FIG. 2, each filter 2 has disposed along the outer periphery of the open ends 20 a strip of heat shrinkable material 26, the heat shrinkable material 26 being stitched to the outer periphery of the open ends 20 as designated by the number 28. The heat shrinkable material is adaptable for fitting over the outwardly extending lip 46 of a flanged portion 36 (FIGS. 3 and 4) of an elongated rectangular shaped frame member 30 whereby upon heating the heat shrinkable material 26, the material 26 shrinks to a fluid tight seal with the elongated member 30. Elongated frame member 30 can further include intermediate sections 32 to define a plurality of openings in each filter 2. Each individual elongated frame member 30 is adaptable for fitting within a generally rectangular shaped frame 4, frame 4 being adaptable for receiving a predetermined number of filters 2 therein. In the present example, as illustrated in FIG. 1, frame 4 is adapted to receive six filters 2, each filter 2 being attached to a frame member 30.

One preferred method of attaching a filter 2 to a frame member 30 is to sew a strip of heat shrinkable material 26 around the open end 20 of the filter 2, insert the filter 2 over the outwardly extending flange portion 36 of the filter member 30, the open end 20 of the filter 2 being slightly larger than the perimeter around the flange 36. The filter 2 attached to the frame member 30 is then subjected to heat treating conditions sufficient to shrink the material 26 thereby engaging the filter in fluid tight relation with the frame member 30. For example, if the heat shrinkable material is a "Clysar" polyethylene film by E.I. Dupont and Company, the film will shrink 25% at 212°F., shrinking being approximately equal in all directions. In using the "Clysar" shrinkable film, passing the filter through a curing oven which is maintained at 300°F. for 15 seconds is sufficient to establish a fluid tight seal between the filter and the frame member 30. A plurality of individual filter assemblies including a filter 2 and a frame member 30 are then inserted in the U-shaped channel upper and lower frame members 22 and 24, respectively, with the end U-shaped channel frame members 42 and 44 being attached to the frame member 22 and 24 by any well known means, such as metal screws, welding, and the like.

It will be realized that various changes may be made to the specific embodiment shown and described without departing from the principals of the present invention.

What is claimed is:

1. A fluid treating filter of the extended surface area type comprising a frame having an upstream and downstream side and at least one flow-through aperture therein, said aperture being defined by a flange on the downstream side of said frame; a filter bag of the extended surface area type having an open upstream end forming a mouth for receiving fluid to be filtered, said filter bag being mounted at its upstream end, said mouth outerfitting said flange; and, a strip of heat shrinkable material attached coextensively with and along the entire mouth of said filter bag, said strip of said heat shrinkable material mating with said flange, said strip having been subjected to sufficient heat to shrink said material to effect a fluid tight seal.

2. The fluid treating filter of claim 1, said flange having an outwardly extending lip.

3. The fluid treating filter of claim 1, said strip of heat shrinkable material being sewn to said filter bag.

4. The fluid treating filter of claim 1, said heat shrinkable material being a polyethylene film.

* * * * *